Oct. 18, 1932.  A. E. BORTON  1,883,513
CUTTING AND FORMING MACHINE
Filed Sept. 10, 1931  13 Sheets-Sheet 1

INVENTOR
Alwyn E. Borton
BY
ATTORNEY

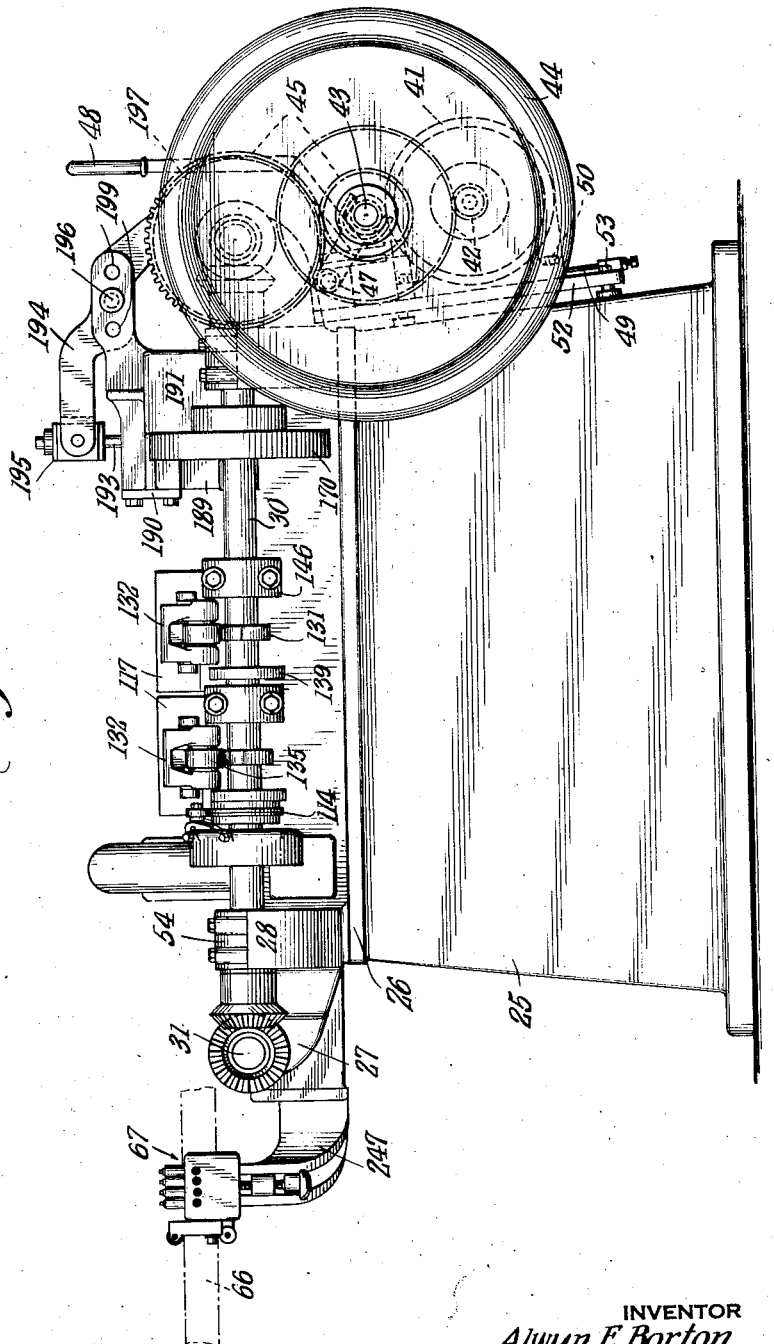

Oct. 18, 1932.　　A. E. BORTON　　1,883,513
CUTTING AND FORMING MACHINE
Filed Sept. 10, 1931　　13 Sheets-Sheet 3
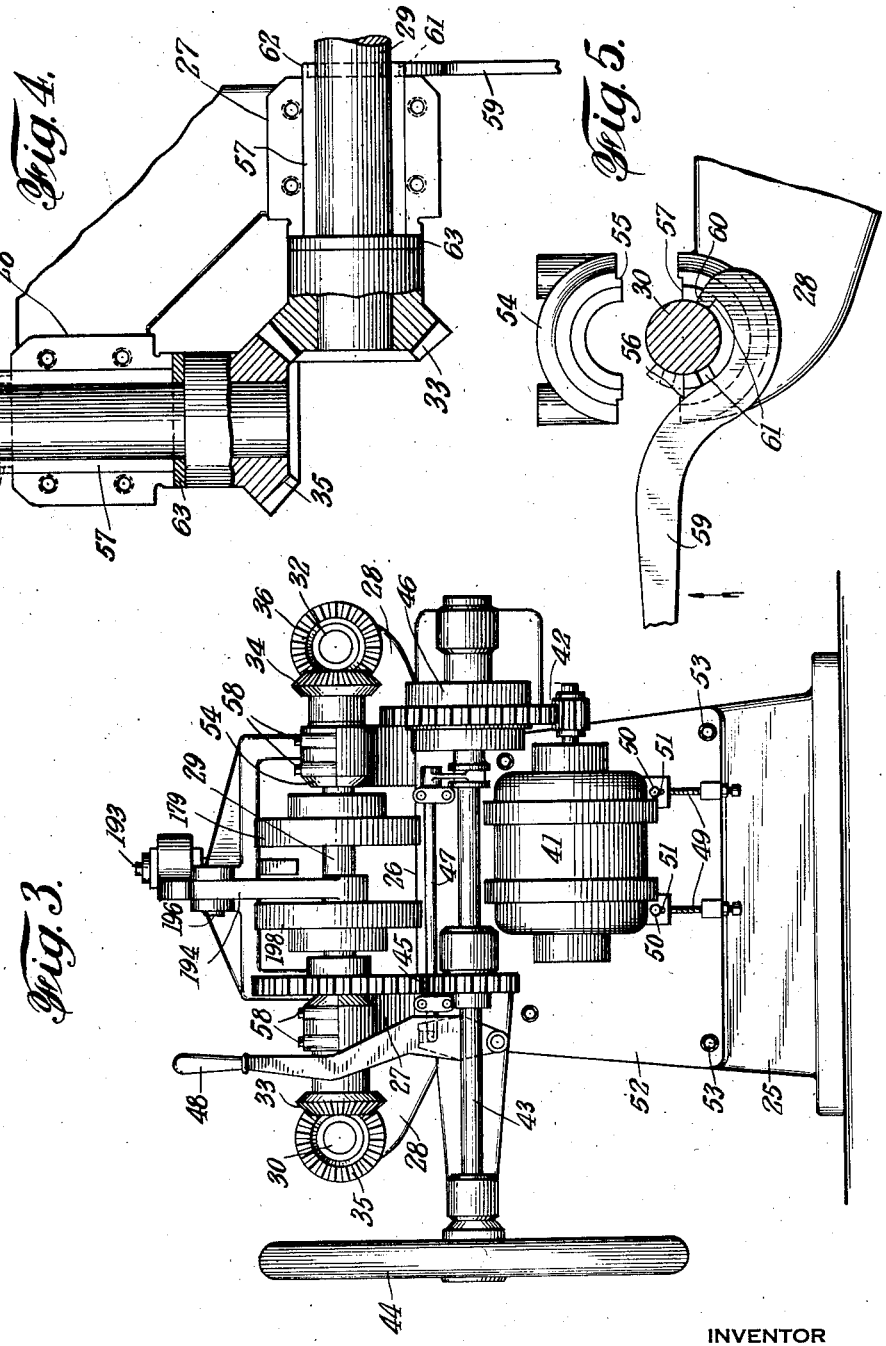
INVENTOR
Alwyn E. Borton
BY
ATTORNEY

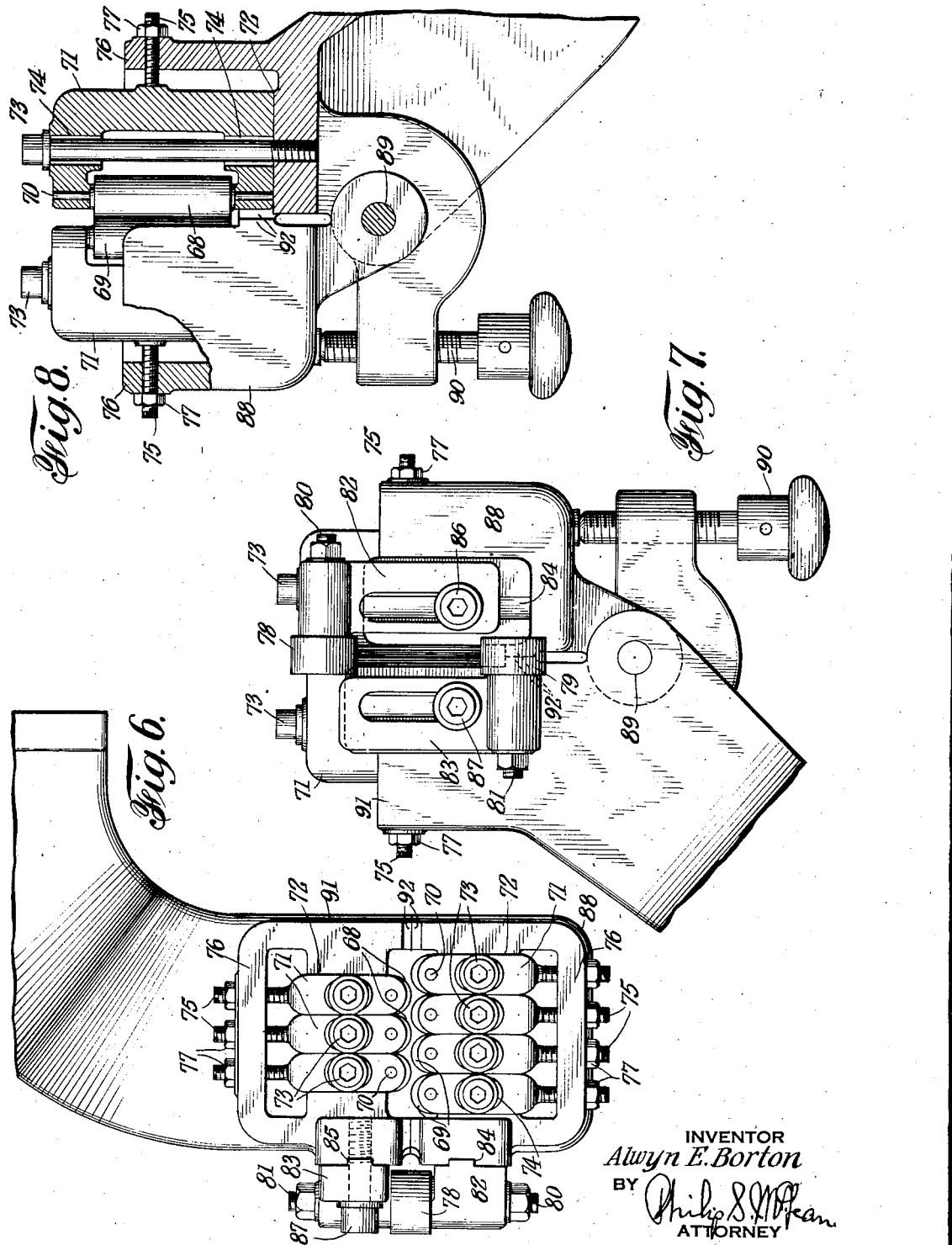

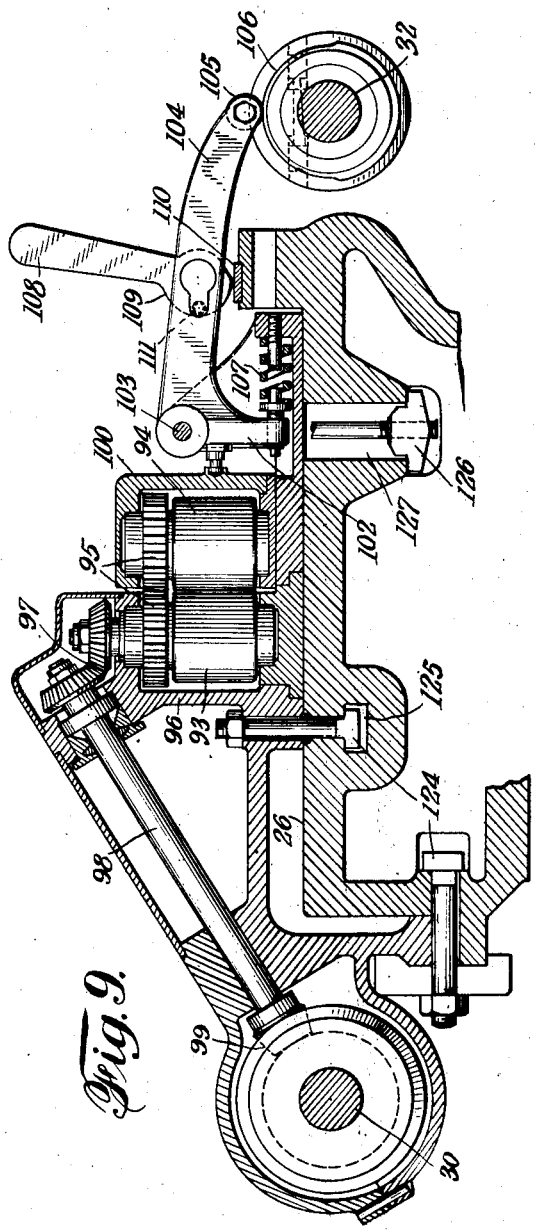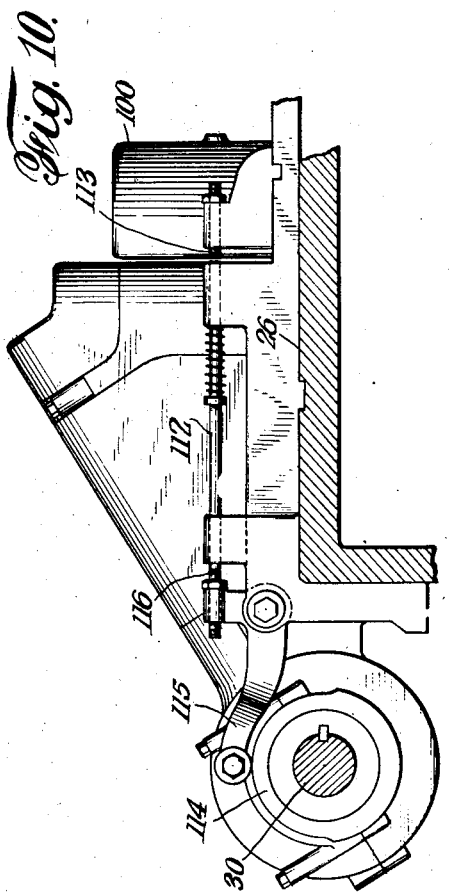

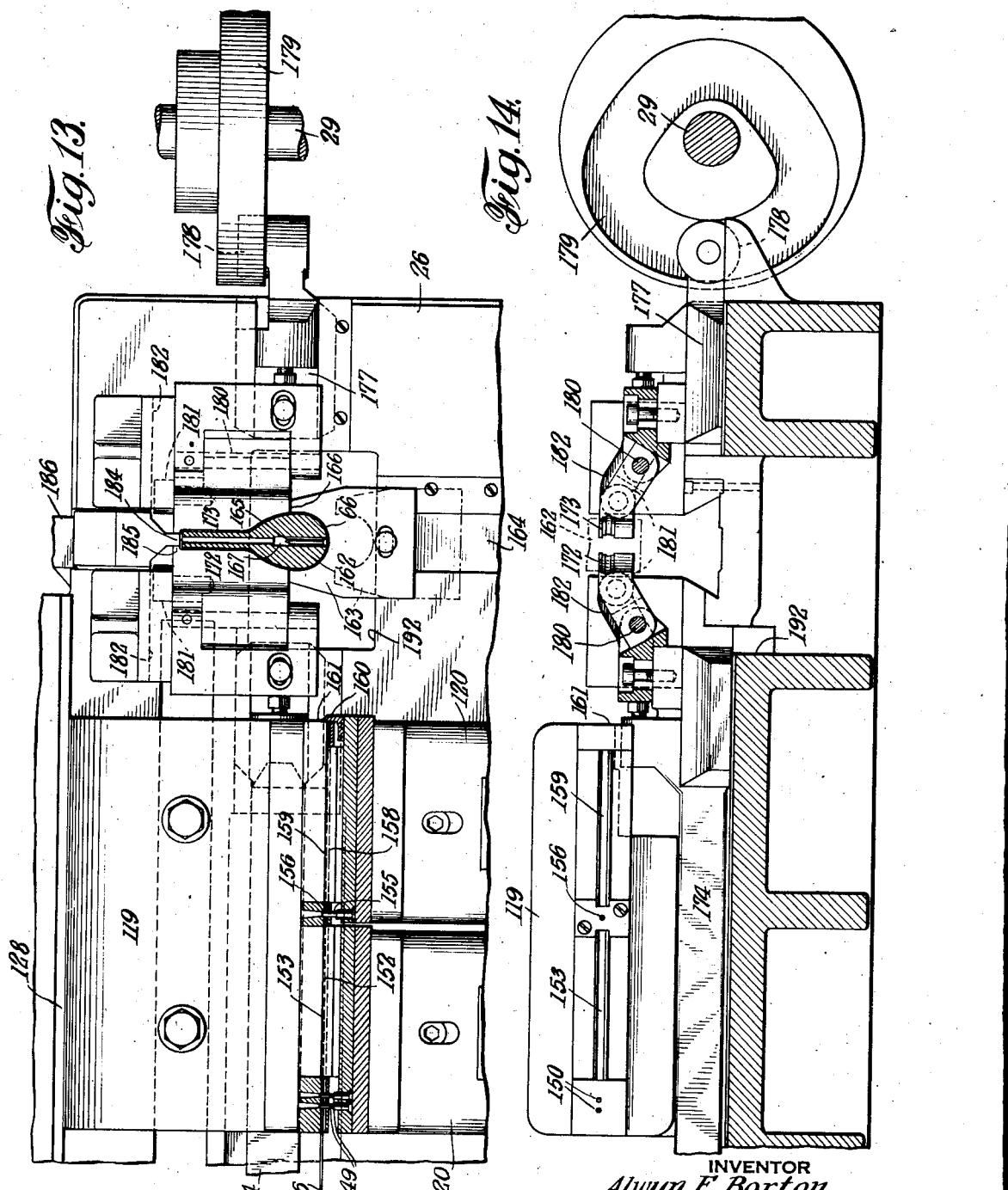

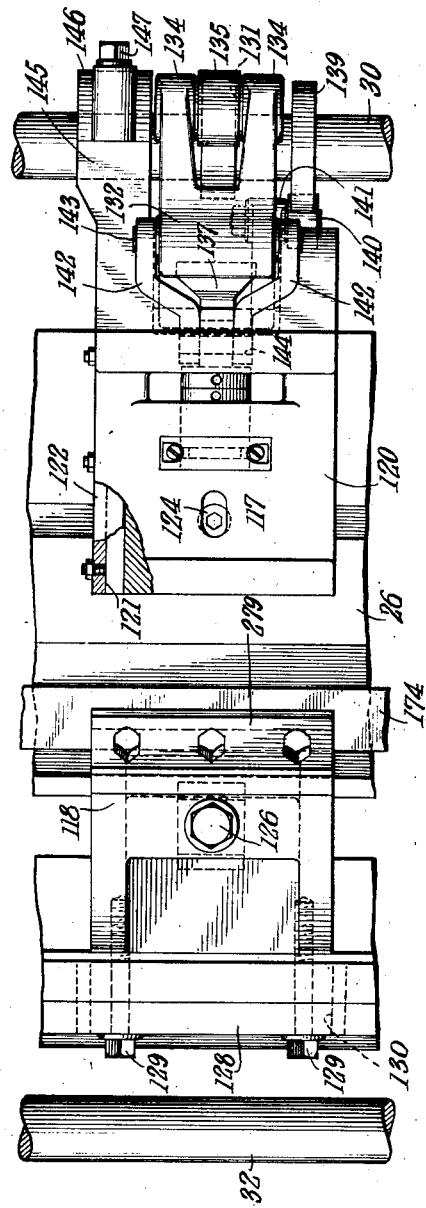
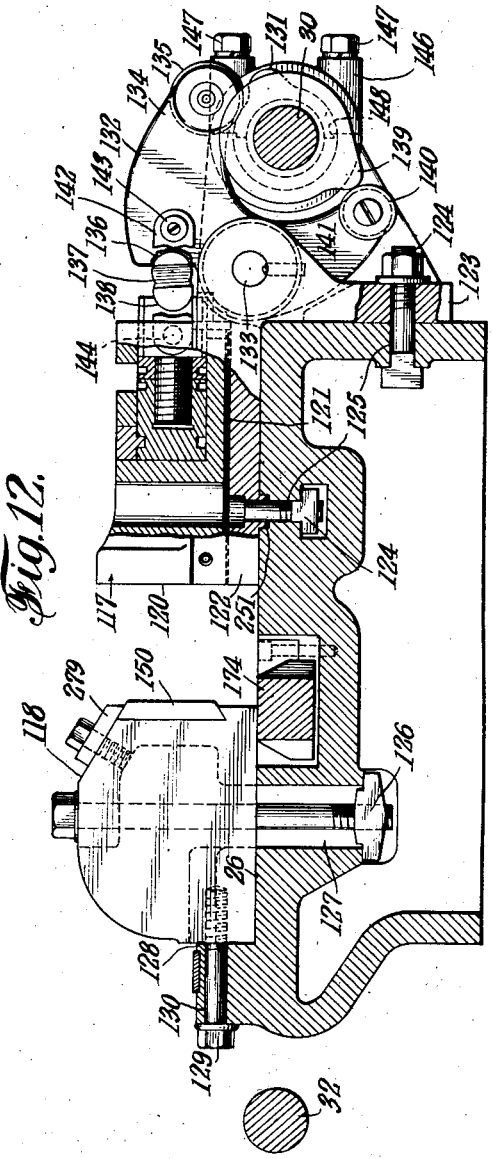

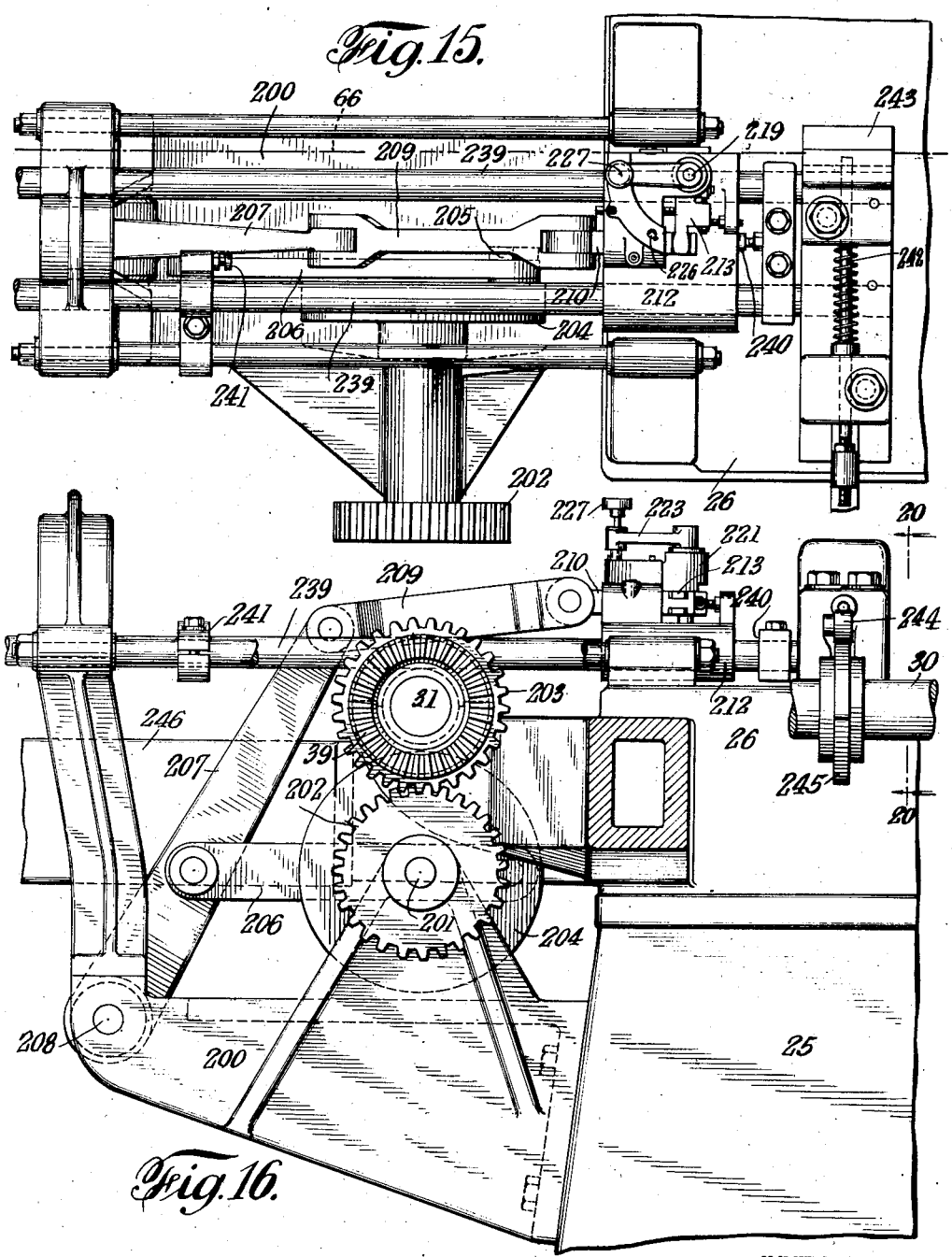

Oct. 18, 1932.   A. E. BORTON   1,883,513
CUTTING AND FORMING MACHINE
Filed Sept. 10, 1931   13 Sheets-Sheet 9
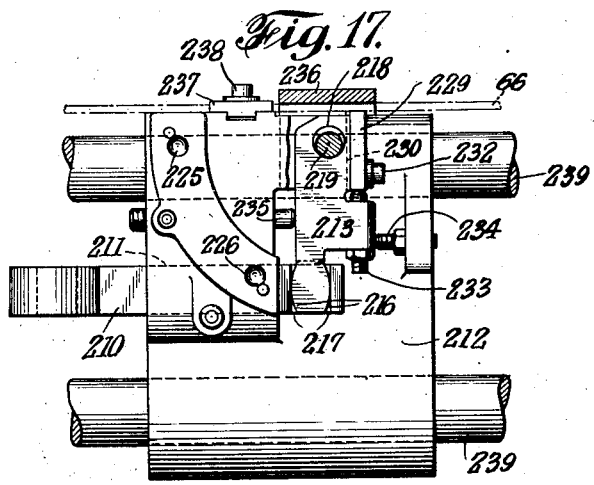
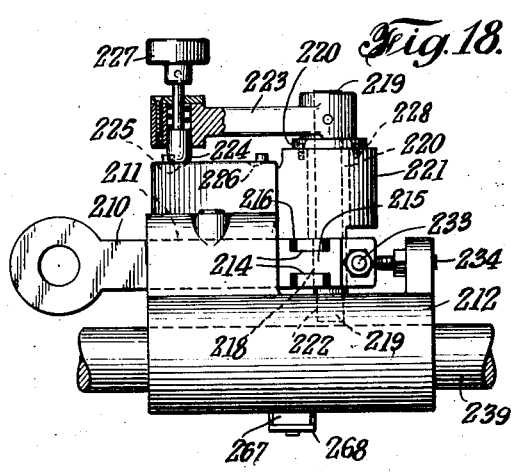
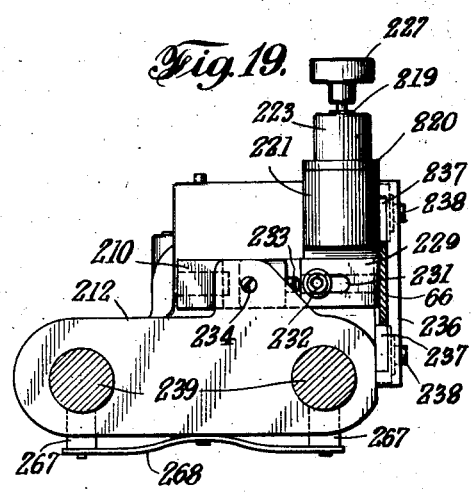
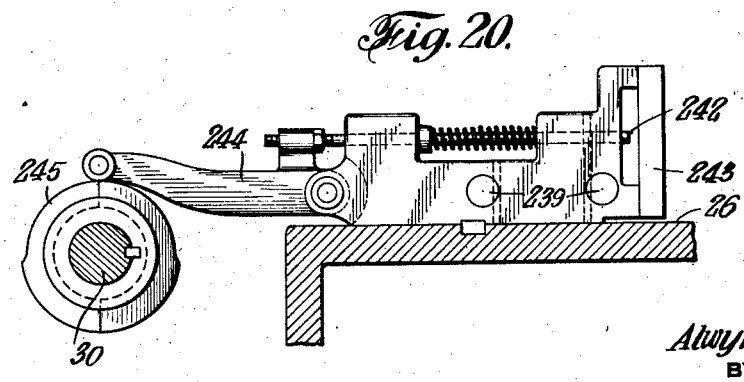
INVENTOR
Alwyn E. Borton
BY
ATTORNEY

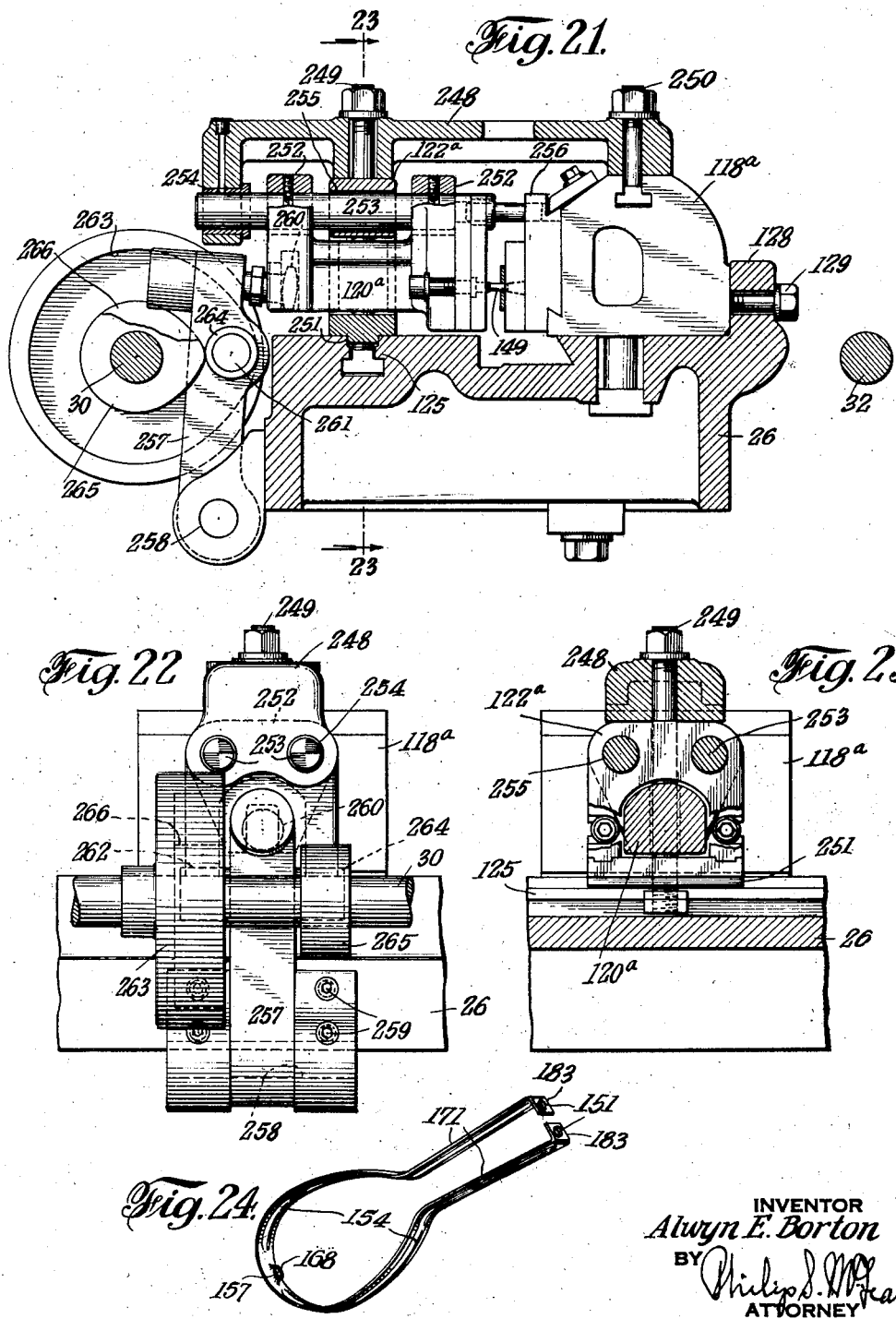

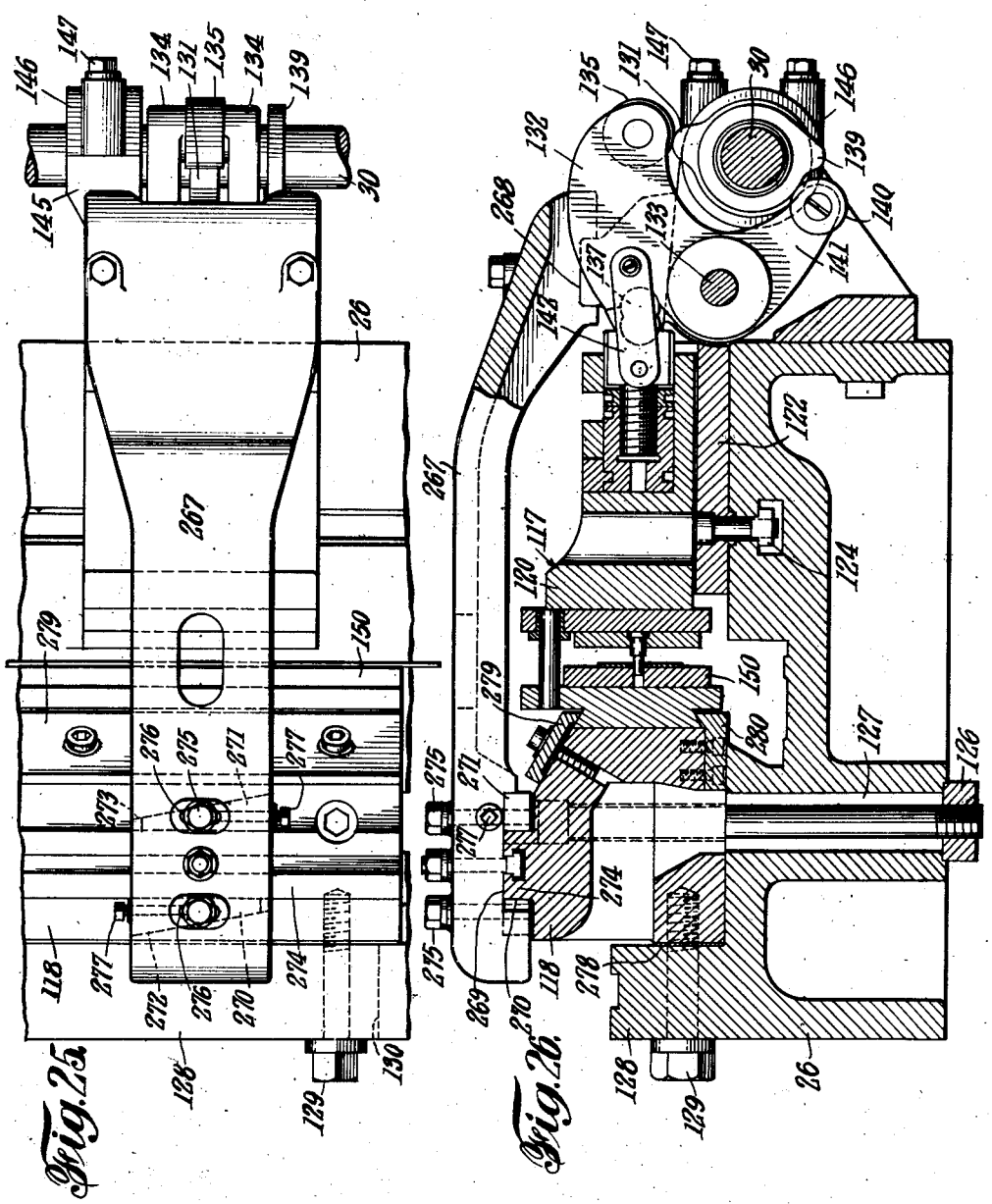

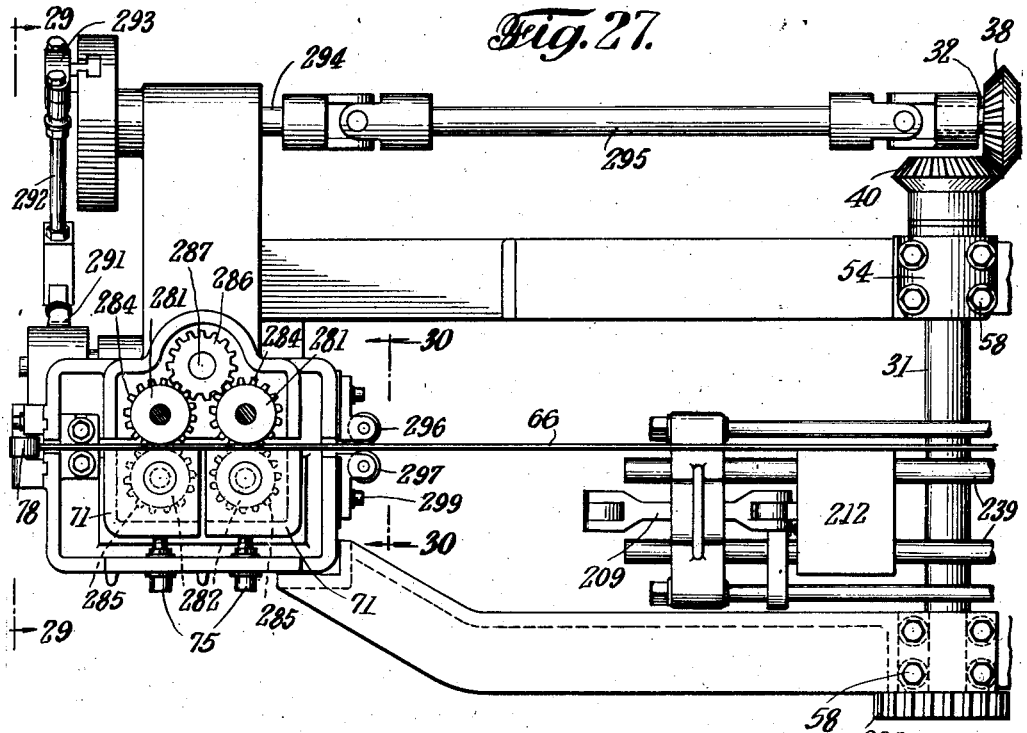
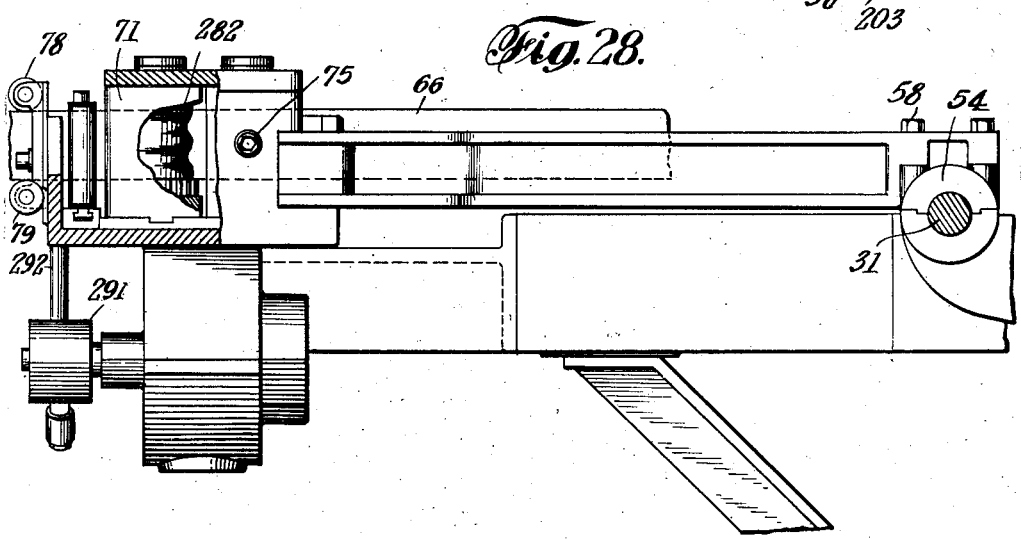

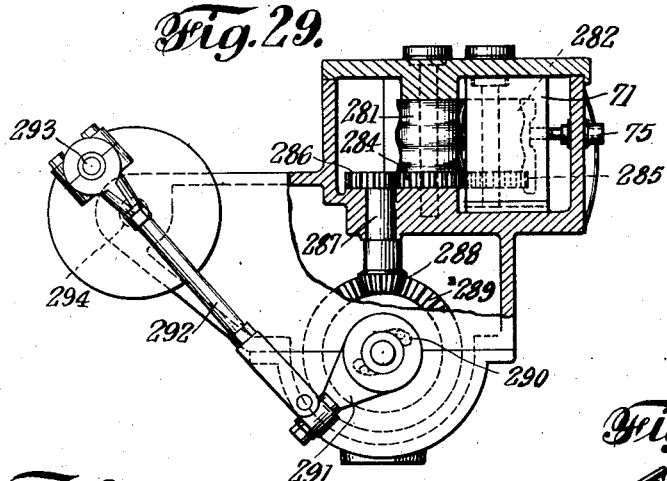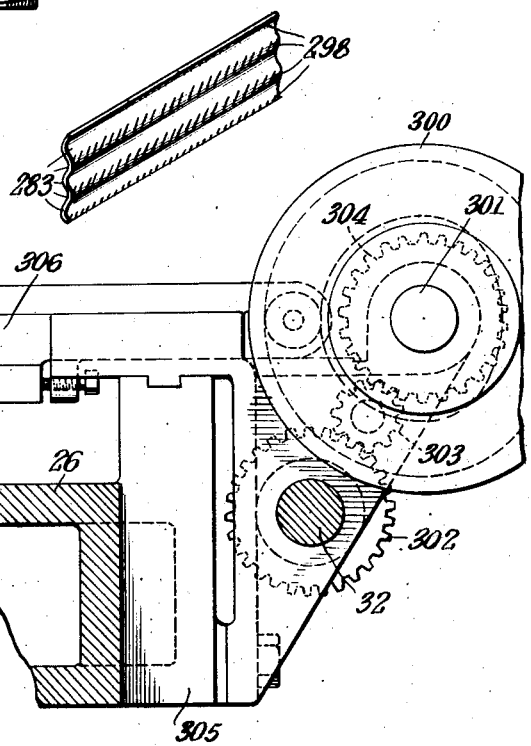

Patented Oct. 18, 1932

1,883,513

UNITED STATES PATENT OFFICE

ALWYN E. BORTON, OF SOUTH ORANGE, NEW JERSEY, ASSIGNOR TO ASSOCIATED MANUFACTURERS, INC., OF AMPERE, NEW JERSEY, A CORPORATION OF NEW JERSEY

CUTTING AND FORMING MACHINE

Application filed September 10, 1931. Serial No. 562,101.

This invention relates to cutting and forming, particularly sheet material, and, more specifically, sheet material in strip form.

The objects of the invention are to provide a machine for automatically effecting, in desirably timed relation, such operations as straightening, feeding-in, piercing, cutting-off, forming, roll forming, knurling, tapping, blanking, drawing, embossing, riveting, staking, bending and discharging; which will be accurate and powerful in its operation, readily adaptable to the manufacture of different kinds of articles, synchronized and balanced for high speed, smooth operation and which furthermore will be of simple, rugged, practical design.

Other objects of the invention and the many novel features of construction, combinations and relations of parts by which such objects are attained, are set forth in the following specification.

The drawings accompanying and forming part of the specification, illustrate certain commercial embodiments of the invention, but inasmuch as such illustration is primarily for purposes of disclosure, it should be understood that the actual physical structure may be modified and changed in various respects, all within the intent and broad scope of the invention.

Fig. 2 is a front elevation of the machine, as viewed from the lower side of Fig. 1;

Fig. 3 is a right hand end view of the machine;

Fig. 4 is a broken part sectional detail, on a larger scale, illustrating removal of the top bearing caps of two of the cam shafts to permit complete detachment of such shafts without disturbing other parts of the machine;

Fig. 5 is a broken detail, partly in section, showing particularly the special wrench employed for rotating the lower half of the bearing to permit sufficient outward movement of the shaft to clear the teeth of the gears connecting adjoining shafts;

Figure 1:
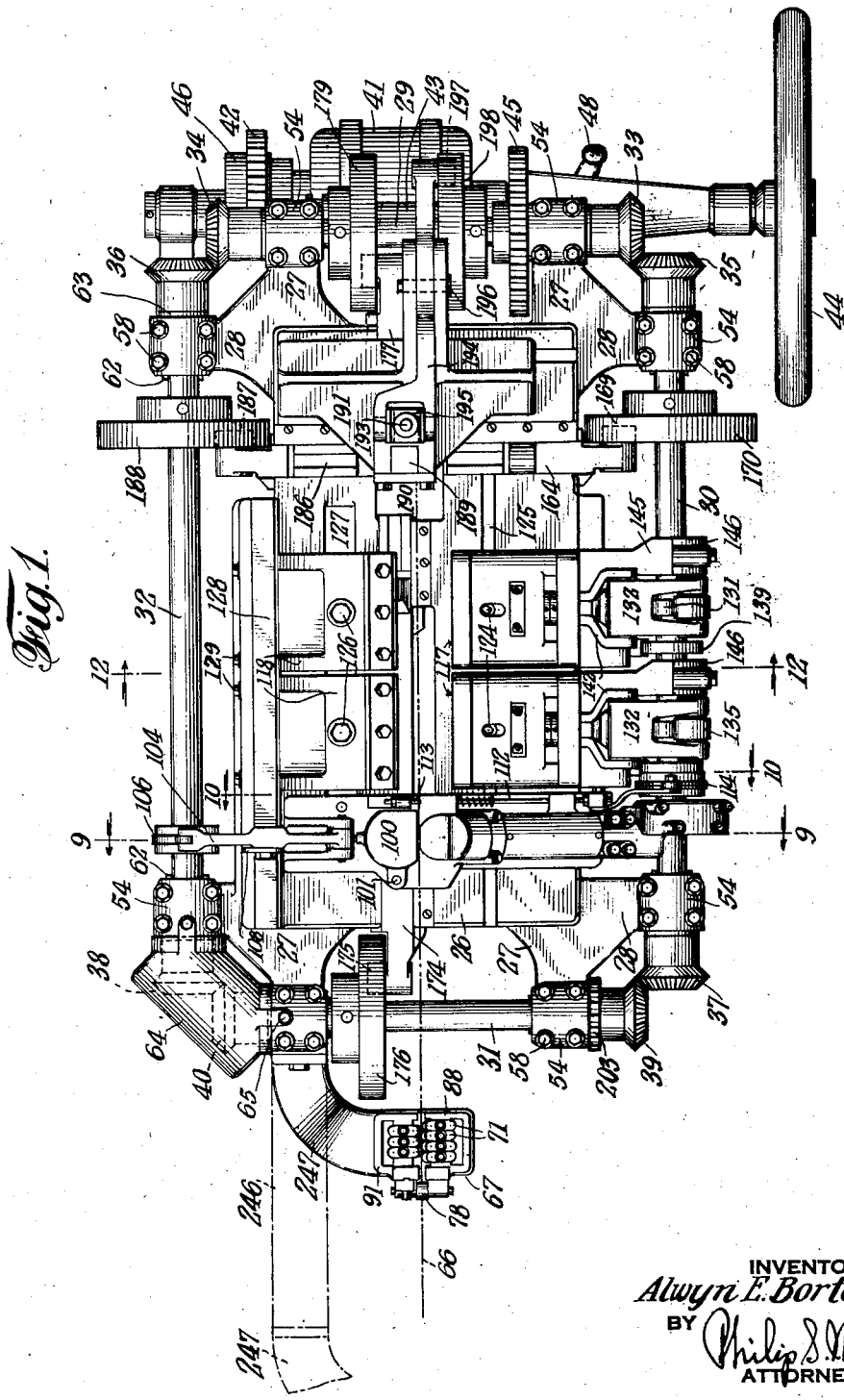
Fig. 1 is a plan view of the machine with the stock indicated entering the machine at the left, through the stock straightener, and with broken lines indicating how this stock straightener may be extended out from the end of the machine to make room for the reciprocating slide feed, when the latter is used in place of the roll feed, illustrated.

Figs. 6, 7 and 8 are broken detail and partly sectional views of the strip straightener; Fig. 6 being a plan; Fig. 7 a view of the entering end, at the left in Fig. 6 and Fig. 8 a view of the opposite end and mid-portion of the straightener.

Fig. 9 is a cross sectional view of the machine as on generally the plane of line 9—9 of Fig. 1 and illustrating particularly the intermittent grip feed rolls;

Fig. 10 is a broken cross sectional detail as on line 10—10 of Fig. 1 illustrating the stock retaining or gripping clamp;

Fig. 11 is an enlarged broken plan of one of the horizontal ram units and companion die-holder;

Fig. 12 is a broken sectional view of such parts, as they appear on substantially the plane of line 12—12 of Fig. 1;

Fig. 13 is a part horizontal sectional and plan view of the right hand end portions of the machine showing particularly the two rams for piercing, forming and cutting off the stock and the slides for flanging and shaping the stock about the fixed upright form;

Fig. 14 is a broken vertical sectional view taken on substantially the feed line of the machine showing the dies and two of the disappearing former slides;

Figs. 15 and 16 are a broken plan and side elevation respectively, of the reciprocating slide form of feed which may be substituted in place of the intermittent grip roll feed;

Fig. 17 is a broken part sectional plan of the adjustable stock gripping clamp of the reciprocating feed mechanism;

Fig. 18 is a broken and part sectional side elevation of the intermittent grip feed slide structure;

Fig. 19 is an end elevation and part sectional view of the feed slide structure;

Fig. 20 is a fragmentary and part sectional detail of the intermittently operating grip for holding the stock against retrograde movement, this view being taken on substantially the plane of line 20—20 of Fig. 16;

Fig. 21 is a cross sectional view illustrating a modified form of ram structure, particularly for a smaller sized machine;

Fig. 22 is a view of the same parts as viewed at the left hand side of Fig. 21;

Fig. 23 is a broken sectional detail as on substantially the plane of line 23—23 of Fig. 21.

Fig. 24 is a perspective view of an egg beater whip, forming a product of the machine illustrated;

Figs. 25 and 26 are broken plan and vertical sectional views respectively, generally similar to Figs. 11 and 12 and incorporating features illustrated in Fig. 21 of a bridge piece tying the die and the base of the ram together;

Figs. 27 and 28 are broken plan and side elevations respectively illustrating the combination of positively driven die rolls for giving the strip stock a desired formation as it enters the machine;

Figs. 29 and 30 are broken end and part sectional views as on the lines 29—29 and 30—30 respectively of Fig. 27, the latter view illustrating particularly the knurling operation;

Fig. 31 is an enlarged detail of the strip stock as given the desired cross-sectional shape by the forming rolls and roughened or toothed by the knurling rolls;

Fig. 32 is a broken sectional detail illustrating a construction for gaining sufficient offset from the side of the machine for the use of larger diameter cams.

The base of the machine, as best shown in Figs. 1, 2 and 3, is in the form of a broad substantial, four-sided pedestal 25, carrying at the top a generally flat, horizontal table 26, providing the bed of the machine. Projecting from the corner portions of the pedestal are the four pairs of rectangularly related bracket arms 27, 28 for carrying the cam shaft bearings.

The cam shafts are arranged in the form of a rectangle about the bed, being designated 29, 30, 31, 32 and a special feature of such arrangement is that these shafts are all geared together at opposite ends so as to evenly distribute and balance the torque. This feature is best illustrated in Fig. 1 where the right hand end shaft 29 is shown as carrying miter gears 33, 34 on its opposite ends in mesh respectively, with corresponding gears 35, 36 on the enjoining ends of the front and back cam shafts 30 and 32, and the latter as having miter gears 37, 38 on their opposite ends in mesh respectively with miter gears 39, 40 on the left hand end shaft 31. There is thus provided a continuous power chain or four-sided loop in which the unit portions of the same automatically cooperate or assist one another in equalizing and balancing the load.

The end shaft 29 may be considered as the drive shaft as that is the one to which power is applied in the present illustration. This shaft is particularly suited for such purposes, it being located at the end of the machine opposite that at which the stock is fed in and, extending only across the end of the machine, being relatively short and therefore well capable of driving from both ends of the same. The power is supplied, in the illustration, by an electric motor 41 operating through gearing 42, Fig. 3, a clutch shaft 43, carrying a combined fly wheel and hand wheel 44 and coupled to shaft 29 by gearing 45. The clutch is indicated at 46 and is shown as controlled by a sliding clutch shifting rod 47, operated by the hand lever 48, mounted on the end of the machine, in convenient position adjacent the hand wheel 44, so as to enable the machine being quickly thrown into power operation, for example after a preliminary hand turning checkup of the operation. The clutch, it will be noted, is disposed between this counter-shaft and the motor so that, with the clutch out, the motor may be left running while hand operation is effected and the motor be cut into service while turning, at the instant the machine parts have been brought to the desired starting position. When the clutch has been thrown out, the fly wheel may be grasped, as a brake, to bring the machine to rest with the parts in any desired position.

To enable adjustment of the motor into properly geared relation with the clutch shaft, the same is shown as shiftable by means of bolts 49 and as secured in adjusted relation by the bolts 50 extending through slots 51, Fig. 3 of the motor base.

A special feature of the entire power transmission is the mounting of the motor, clutch shaft, fly wheel, clutch and clutch throw-out all on a single panel 52 detachably secured as by bolts 53, on the end of the base pedestal, providing thus a single complete power unit, which may be mounted or unmounted as such without in any way disturbing other portions of the machine. This ready removability of the transmission also enables quick conversion of the machine to other forms of drive.

The cam shafts are solidly mounted and at the same time made readily removable, by the construction illustrated particularly in the first five figures, and involving the feature of splitting the bearings horizontally on the centers of the shafts, providing the removable top bearing caps 54, keyed by shoulders 55, 56 (Fig. 5) down in the lower halves of the bearings which are solid with the bearing arms or brackets 27, 28 and by making the lower halves 57 of the bearing boxes as removable semi-cylindrical segments which can be rotated out of their seats to provide clearance for shifting the shafts to unmesh the miter gears. By such construction, the load is carried by the bearing members solid with the bed, instead of by the bearing bolts and, at the same time, the loosening of the bolts 58 holding the bearing caps in place, permits these caps to be removed, leaving the shafts cradled in the lower bearing halves, which can then be turned, as by means of the special wrench shown at 59 in Fig. 5 to slip such bearing halves from beneath the shafts, which then can shift outwardly to clear the miter gears on the ends of the same from mesh with the companion gears on the adjoining shaft ends. The special wrench shown is of the spanner type to reach about the underside of the slip bearing and having an inwardly projecting lug 60 at its inner end to enter a notch or notches 61 cut in the portion 62 of the bearing member, projecting as shown in Fig. 4 beyond the end of the bearing bracket. Thrust washers 63 interposed between the opposite ends of the bearing brackets and the backs of the bevel gears hold the shafts against endwise movement and maintain such gears properly meshed. These positioning elements, however, do not interfere with the dropping away of the shafts to unmesh the miter gears, just described.

Gear cases such as indicated at 64, Fig. 1, may be provided over the miter gears, the same being shown as split horizontally and arranged with the upper halves bolted to the adjoining bearing caps at 65 so as to lift off with such bearing caps. These gear cases provide mechanical protection, serve as lubrication wells and do not interfere with removal of the bearing caps. If desired, however, these gear cases may be opened up without disturbing the bearings, on removal of the fastenings 65. The miter gears all face outwardly to keep the projection at the corners down to a minimum and this also enables full inspection of the gears when the top covers are removed.

The design, arrangement and number of cams on the several cam shafts will vary with the work that is to be performed, the sequence of operations, etc.

By way of example, the machine of the present disclosure is illustrated as tooled-up for the manufacture of the whip of an egg beater such as shown in Fig. 24, the production of which involves the various steps of severing, punching, forming transversely, drawing and bending longitudinally.

Considered in the sequence of operations, the strip stock which is designated 66, first passes through a stock straightener 67 at the left hand end of the machine, Figs. 1, and 2. This stock straightener is of special construction, made up, as shown in Figs. 6, 7 and 8, of two series of vertically disposed rollers 68 and 69 arranged in alternating relation at opposite sides of the feed line and journalled individually at 70 in narrow blocks 71 which can be independently adjusted. In the illustration, the roller carrying blocks of each set stand side by side in a seat or cavity 72 and they are held by through bolts 73 extending down through slots 74 in the blocks into the bottoms of such seats. Adjustments of the individual blocks are effected by the screws 75 threaded in the back walls 76 of the roll seats or sockets and made fast by lock nuts 77. It will be seen that upon loosening the securing bolts 73 and turning the adjusting screws 75, the individual roll blocks may be readily shifted to vary the positions of the rolls, for properly acting on different kinds and sizes of stock.

Edgewise guiding and straightening of the stock is effected in the illustration by the upper and lower guide rolls 78, 79 journalled above and below the entrance to the straightener on the horizontal centers 80, 81 and shown as adjustable for different widths and vertical positioning of the stock by being mounted on vertically shiftable brackets 82, 83 slidingly keyed in the vertical grooveways 84, 85 and secured in the desired relations by bolts 86, 87.

To permit the positioning of the strip in the straightener without forcing or dragging it through the rolls, the rolls are made to open up as a pair of jaws, in the illustration, by mounting the box or holder for one set of rolls as a hinging member which can be dropped down to open up a clear space between the two sets of rolls. This is accomplished by pivoting the box or holder 88 for the set of rolls 69, at 89 and by providing a hand screw 90 engaging the underside of the holder, which can be backed off to permit the holder to drop away from the other fixed holder 91 or turned up to bring this set of rolls into operative relation with the other set of rolls. Cooperating stops 92 are shown in Figs. 7 and 8 on the adjoining edges of the boxes to limit the closing movement of the movable box and hence to definitely position the vertical rolls in true parallelism when in operative position, irrespective of their individual settings.

It will be seen particularly from Figs. 7 and 8 that upon backing off the hand screw 90, the holder 88 carrying the one set of straightener rolls 69 and top gaging roll 78, will swing about the center 89 to provide clearance for placing the stock down edgewise between the two sets of rolls, resting upon the lower gage roll 79. Then the hand screw may be turned up to throw the movable roll holder back into position with the upper gage roll 78 engaged over the upper edge of the stock and the two sets of vertical rolls properly engaging opposite faces of the strip. If individual adjustments of the rolls are necessary, these can be readily made and such individual adjustments once made are not disturbed when the straightener is again opened up to receive another length of stock.

Various forms of feed mechanism may be employed, particularly for handling different forms of stock. In Figs. 1 and 9, an intermittent grip roll form of feed is illustrated comprising vertically journalled companion rolls 93, 94 geared together at 95, one mounted in a fixed journal box 96 and driven through bevel gears 97 from an inclined shaft 98 operated by bevel gearing 99 from the front cam shaft 30; the other roll 94 being separable from the first by reasons of its mounting in a movable journal box 100 mounted for swinging motion on pivot 101 and acted on by one arm 102 of a bellcrank lever pivoted at 103 and provided on its other arm 104 with a roll 105 riding the cam 106 on the back cam shaft 32. The spring 107 acting on the short arm of the bellcrank serves for thrusting the movable roll yieldingly toward the fixed roll and to hold the cam roll properly engaged with the cam. The high portion of the cam, it will be observed lifts the long arm of the bellcrank to effect release of the rolls from gripping engagement with the stock.

To enable the feed rolls being tripped and held out of gripping engagement with the stock, a hand lever 108 is shown provided on the long arm of the bellcrank 104, the same being provided with a cam portion 109 which when the lever is turned inward or toward the center of the machine, will engage a pad or step 110, to lift this arm of the bellcrank and hence to free the same from control of the cam 106, in a position with the movable feed roll backed off from its companion roll. The feed operation is thus under control of the handle 108 and this handle can be quickly operated at any time to stop the feed of stock, without interrupting the action of the other parts of the machine. Spring detent mechanism indicated generally at 111 in Fig. 9 may be provided for releasably retaining the trip lever 108 in its inoperative relation.

The stock advanced by the feed mechanism is definitely held by an intermittently acting grip device, shown in Figs. 1 and 10 as consisting of a spring retracted plunger 112 located at one side of the feed line and cooperating with an adjustable stop screw 113 located at the opposite side of the feed line, said plunger being operated to close onto the stock at the end of the feed movement by means of a cam 114 on the front cam shaft 30, operating on one arm 115 of a bellcrank whose opposite arm carries an adjustable screw abutment 116, positioned to engage the outer end of the plunger. The adjustable screw shoulder 116 and the adjustable stop 113 permit this intermittent clamp device to be set to very accurately grip and hold the stock.

The heavy work of the machine is performed by one or more rams mounted on the intermediate portion of the bed. In Fig. 1 two such rams are indicated at 117 for carrying tools to cooperate with corresponding dies in the die blocks or holders 118. These rams may be built up as single or multiple units and similarly the die holders may be made up as individual units as in Fig. 1, or a single holder may be provided as illustrated at 119 in Figs. 13 and 14, for cooperation with a plurality of rams.

The ram structure includes a slide 120 guided to operate in ways 121 in a base 122 adjustably mounted on the bed. In Fig. 12 this ram base is indicated as of angular formation having the top portion 122 to rest on top of the bed and a dependent angularly related portion 123 to engage over the side of the bed, the two such portions being individually adjustably fastened to the bed by the bolts 124 entered through slots 125 in the top and side walls of the bed. These bolt fastenings are indicated as toggles operating in the slots on the bed and enabling the entire ram structure to be readily shifted and secured in any desired relation on the bed.

Similarly the anvil blocks or die holders 118, 119 are shown as secured by toggle bolt fastenings 126 adjustable along longitudinal slots 127 in the top of the bed to enable quick setting of the same to match the rams. These die holders are shown as of generally angular cross section and as seating back against a shoulder or rail 128 along the back edge of the bed, bolts 129 extending through longitudinal slots 130 in this abutment rail into the backs of such die holders. By such construction, the die holders are solidly anchored on the bed but may be readily adjusted to meet different requirements. The same type of toggle bolt fastenings may be and preferably are employed for adjustably securing other portions of the mechanism on the bed, for instance the roll feed device, last above described, such fastenings being generally designated as 124 in the top bed slot 125 and 126 in the wider bed slot 127.

Smooth powerful operation of the rams is effected from cams 131 on the front cam shaft 30, by means of rockers 132, of generally triangular form, pivotally mounted at their lower corners on bearing studs 133 carried by the ram bases, having their upper outer corner portions forked as at 134, Fig. 11 for the mounting of the cam rolls 135 and having partly cylindrical seats 136 in their upper corners, over the pivotal centers 133, to receive the rolling toggle levers 137 which engage in part-cylindrical seats 138 in the outer ends of the slides. The parts are so designed that each cam rocker with its associated rocking toggle member 137 constitute in effect a cooperating pair of toggle levers which operate in a toggle-straightening direction in the active stroke of the ram and hence give the added power of a true toggle in the action of the ram.

The ram slides are positively withdrawn in the ilustration by additional cams 139 on shaft 30 acting against cam rolls 140 on cam levers 141 connected with or formed as lower extensions of the rockers 132, the links 142 pivotally connected to opposite sides of rockers 132 at 143 and with opposite sides of the slides at 144 providing the necessary pull connection between rockers and slides for this result.

In addition to constituting a single unit complete in itself and with all parts mounted on a single base which can be adjustably secured on the bed, each ram preferably is utilized to provide an additional bearing for the shaft which effects operation of the same. Thus in the illustration the base of each ram carries an outwardly extended bearing 145 embracing an intermediate portion of shaft 30 at a point adjacent the ram actuating cam. These are indicated as vertically split bearings, the removable caps 146 of which may be taken off at the sides of the machine upon removal of bolts 147, these caps being keyed horizontally into the inner fixed members of the bearings at 148, so that the load, which is generally vertical in this case, will be carried by the main parts of the bearings, instead of by the bearing cap bolts. These intermediate bearings thus provided for the cam shaft at each of the rams enable this shaft to carry heavy loads without distortion and without the necessity of making the shaft unduly heavy.

The tools operated by the rams are indicated in a general way in Figs. 13 and 14, where the first or left hand ram is shown as carrying punches 149 cooperating with a perforated die 150 on the angle block 119, for providing the bearing openings 151 (Fig. 24) in the ends of what will become two adjoining strip lengths and a rib 152 cooperating with grooved portion 153 of the die holder, to provide one of the transverse corrugations 154 in a strip length. The second ram carries a single punch 155 cooperating with die 156 to pierce the center bearing opening 157 in the piece, a rib 158 cooperating with grooved die 159 to form the second transverse corrugation 154 in the piece and a knife 160 cooperating with the cutting edge 161 of the die to sever the stock.

Upon retraction of the ram, the pierced and formed length of stock is advanced by the feeding mechanism into position between the former or mandrel 162, Fig. 13 and a concave bending tool 163 carried by the transversely acting slide 164, at a time when this slide is withdrawn, as indicated in the dotted lines. This bending tool carries at the center a point or prong 165 which projects beyond the ends 166 of the tool sufficiently to hold and center the piece before it is severed from the following length of strip. This prong drives into a cavity 167 in the mandrel, continuing its hold on the piece as the tool bends the strip about the mandrel and near the end of its stroke draws the metal about the perforation 157 up into a flange or bearing hub 168.

Referring to Fig. 1, it will be seen that the transversely operating bending slide 164 carries at its outer end a cam roll 169 operated by cam 170 on the front cam shaft 30.

The ends of the piece are bent about the sides of the mandrel to form the substantially parallel shank portions 171 of the whip, Fig. 24, by the correspondingly shaped forming tools 172, 173, Figs. 13 and 14, the first of which is operated from slide 174, Figs. 1 and 13 carrying cam roll 175 engaged with cam 176 on the left hand cam shaft 31 and the other of which is operated from slide 177, provided with cam roll 178, actuated by cam 179 on the right hand cam shaft 29.

To prevent the side formers 172, 173 from interfering with the operation of the bending former 162, which doubles the piece about the mandrel, these side formers are made to "disappear" or drop down out of the plane of the strip at the proper instant by pivoting them at 180 on the ends of the slides 174, 177 and providing them with cam rolls 181 engaging in the cam ways 182. These cam ways, as shown in Fig. 14, cause these tools to lower as they are retracted and at the time of such retraction the piece is doubled about the mandrel in a plane above such tools and into position to have the end portions of the same engaged by the side bending tools as they come together and advance up into the plane of the piece then held on the mandrel by the bending tool 163.

The ends of the piece are angled inward and bent along the lines 183, Fig. 24 by the combined action of side bending tools 172, 173 and an end bending tool 184, Fig. 13, said side bending tools having angled tips 185 which turn in the ends of the piece about the corners of the mandrel and tool 184 entering between these bending tips to flatten the ends down over the flat end face of the mandrel.

The end bending tool 184, Figs. 1 and 13, is carried in the illustration by the slide 186, provided with cam roll 187, engaged by cam 188 on the rear cam shaft 32.

The vertical mandrel 162 is supported in the present disclosure by having at its upper end a squared shank portion 189, Fig. 1, clamped at 190 on the bracket or head 191 on the right hand end of the machine. This bracket head serves as a mounting for the stripper, when such is required. In the present instance no stripper action is required because the end bending tool 163, Fig. 13 is retracted before the side bending tools 173, to pull the bushing point 165 out of the piece while the bent ends of the latter are yet hooked about the angled face of the mandrel. Then as soon as the side benders 172, 173 and intermediate end bending tool 184 retreat, the doubled piece of material will spring open and drop clear of the mandrel through the discharge opening 192 in the bed, down into the hollow pedestal.

For work requiring the service of a stripper or a vertical punching or bending operation, a plunger 193, Figs. 1 and 2, is provided mounted for vertical movement in the bracket head 191 and adapted to carry suitable stripper, punching, bending tools or the like for proper co-action with other cooperating parts on the machine. This vertical plunger is shown as actuated by cam lever 194 having a rocking and sliding joint with the head of the plunger at 195 and supported on a pivot pin 196 in position for the cam roll 197 on the outer end of the same to cooperate with cam 198 on the right hand end cam shaft 29.

To enable the stroke of the stripper plunger 193 being readily varied without changing the cam, the pivot pin 196 mounting the cam lever 194 is shown as insertable in different bearing openings 199 in the supporting bracket and lever respectively, Fig. 2.

For certain classes of work, the reciprocating form of feed mechanism illustrated in Figs. 15 to 19 is used in place of the roll feed mechanism heretofore described. The substitution is accomplished, after removal of the roll feed and stock holding devices shown in Fig. 1, by mounting a special bracket 200, Figs. 15 and 16, on the left hand end of the machine below the cam shaft 31. This bracket mounts a shaft 201 carrying a gear 202 meshed with a gear 203 in back or forming a part of miter gear 39 and a crank disc 204 having an adjustable-throw connection 205 with one end of a link 206 whose opposite end is pivotally connected with a rock lever 207 pivoted at its lower end on the bracket at 208 and having its upper end connected by pivot link 209 with a special drag link 210. As appears more particularly in Figs. 17 and 18, link 210 has a sliding bearing at 211 in feed block 212 and is articulated at its forward or inner end to the jaw lever 213. To provide a close, positive but free acting joint between the two, the jaw lever is shown as slotted in its end at 214 to receive the reduced neck portion 215 of the push-pull link 210 and the bifurcated portions of the lever are shown as having rounded bearings 216 in close rocking engagement with the parallel shoulders 217 at the ends of the reduced neck portion of the link.

The grip lever 213 is shown in Fig. 17 as mounted to swing on a bearing 218 formed as an eccentric on the spindle 219. This spindle is shown as journalled in a bushing 220 set in an upstanding post 221 on the feed slide and as stepped at its lower end directly in a bearing 222 in the slide. The purpose of this eccentric bearing is to enable a quick shifting of the feed lever to throw it into or out of operative position. For such purpose, a crank handle 223 is pinned on the upper end of the bearing spindle and this carries at its free end a spring pressed plunger 224 adapted for engagement with locking depressions 225, 226 to hold it in either feed operative or inoperative positions. A knob 227 on the upper end of the spindle enables the same to be readily withdrawn from the holding recesses 225, 226 and serves as a handle for easily swinging the lever one way or the other. The bearing bushing 220 is of a size larger than the eccentric 218 to enable the insertion of the parts down in the post 221 and this bushing is held down in its seat by an end screw or screws 228 so that by engagement with the eccentric it holds the spindle down in place against the uplift force of the spring detent 224.

The feed lever 213 carries at its forward side a jaw block 229 keyed in the face of the same at 230 and longitudinally slotted at 231 for the securing bolt 232. For accurate setting of this grip block, an adjustment screw 233 is shown bearing on the end of the grip block, Fig. 17 and fastened as by means of an ordinary lock nut.

The throw of the stock gripping lever is determined by the adjustable front and back stop screws 234, 235, which are set to enable the jaw part 229 to firmly grip the stock against the companion fixed jaw plate 236 on the forward rocking movement of the lever and to permit the movable jaw part to fully free the stock on the reverse motion of the lever.

Edge gages 237, adjacent fixed jaw plate 236, Fig. 17, adjustably secured at 238, definitely position the strip for proper engagement by the intermittently acting clamp described.

The feed block 212 which mounts the clamp is arranged to slide on guide rods 239, Figs. 15, 16 and preferably the latter carry adjustable limit stops 240, 241 for the sliding feed block. The forward stop 240 is particularly important as this determines the exact limit of movement of the feed block.

To insure the release of the stock at the end of the forward movement of the clamp, the feed slide may be and preferably is equipped with a friction brake, such as illustrated in Figs. 18 and 19 and comprising sliding brake shoes 267 in the feed block, yieldingly pressed by spring 268 against the guide rods 239. This brake causes the slide to momentarily rest at the end of its forward stroke, so that the link 210 as it starts back will rock the lever 213 and thus pull the movable jaw of the clamp open at the commencement of the back stroke of the crank actuated lever 207. The same "dwell" is effected at the end of the back stroke, the brake causing the feed block to momentarily come to rest at the end of its outstroke, whereupon the link 210 will rock the jaw closed against the stock at the proper instant at commencement of the feed stroke. Consequently, the stock will be released at the end of the feed stroke and will be positively and firmly gripped at the proper instant in the commencement of the feed stroke, insuring consistent accurate feeding of the stock.

When this reciprocating form of feed is employed, the strip straightener is offset to make room for the same, in the manner indicated in Fig. 1 by interposing an offsetting bracket between the end of the machine and the angle bracket 247 which forms the base of the straightener.

To definitely secure the stock in the position to which it is advanced by the feed slide, an intermittent clamping device similar to that previously described, is employed, comprising as shown in Figs. 15, 16 and 20 a spring retracted plunger 242 for gripping the stock against a guide 243, under the impulse of a rocking bell crank lever 244, actuated by the adjustable split cam 245, on the front cam shaft 30.

For some classes of work, a lighter form of ram construction may be employed such as indicated in Figs. 21, 22, 23, where the ram and the die block are shown connected up together as a single unit by means of an overstanding bridge piece 248 secured by bolts 249, 250 to the ram base or guide 122a and angle block 118a, respectively. The bolts 249 are similar to the toggle bolts 124 in Fig. 12 in that they interlock in the undercut slot 125 in the base and in this construction also the ram guide is keyed in the top of the slot substantially as indicated at 251 to accurately lock the mechanism solidly down on the bed.

The slide 120a, in this Fig. 21 construction has portions 252 carrying rods 253, which slide through bearings 254, 255, carried by the bridge piece and by the base of the ram. The head of the ram carrying the punch or other tools 149, has a sliding bearing at 256 in the die or angle block.

The ram is actuated in this case by an upright cam lever 257 pivoted at its lower end at 258 in special brackets 259 bolted to the side of the bed. At its upper end the lever has a rocking and sliding connection at 260 with the ram head and in its intermediate portion it carries a pin 261 projecting from opposite sides of the same and mounting a roll 262 at one side engaged in the groove of the combined driving and retracting cam 263 and at the opposite side of a roll 264 engaged with the face of the drive cam 265. The inside face 266 of the grooved cam 263 being similar in outline to face cam 265, acts as a second drive cam, thus balancing the force applied to the lever which, as indicated in Fig. 22, operates in between the two cams.

The bridge construction illustrated in Fig. 21 is applicable to the heavier form of machine shown in Figs. 11, 12, and is desirable for particularly heavy work.

In Figs. 25 and 26, this bridge or tie member is designated 267 and is shown as keyed and bolted down over the base of the ram at one end at 268 and as keyed and bolted down over the angle block at the other end at 269. As with this construction the ram and the die are tied together at the top as well as by the bed of the machine, the full power of the cams may be utilized for extra heavy forming or other operations.

As the tools wear down, relative adjustment of the ram and die become necessary. Such adjustments are allowed for in the overhead connection by the reversely facing wedges 270, 271, shown as seated against inclined shoulders 272, 273, on the underside of the bridge and bearing against opposite sides of the key rib 274 on the anvil block. These wedges are indicated as secured by bolts 275, extending down through slots 276 in the bridge member and as independently adjusted in opposite directions by set screws 277. At the time of making these adjustments, shims 278 may be placed between the back of the anvil block and the abutment rail 128, to make the mounting absolutely solid on the bed.

Another feature disclosed particularly in Fig. 26, is the securing of the die 150 to the angle block by the readily releasable hardened steel clamps 279, 280, engaged with undercut shoulders on the back of the die member. Upon release of the bolt securing the upper clamp 279, it will be seen, that the die may be adjusted or removed. The companion clamp member 280 at the bottom being of hardened steel, does not wear under the clamping action and this lower clamp being itself readily removable allows for replacement of different kinds or sizes of clamps for cooperation with different kinds of dies.

The stock straightener may be utilized as or have combined with it a forming roll or rolls designed to give the stock a special configuration or cross-section as it enters the machine. This feature is illustrated in Figs. 27 to 31, where the two sets of forming rolls are designated 281, 282, and are shown as designed to cross corrugate the strip as at 283 in Fig. 31.

The feed slide shown in Figs. 15 to 19 is powerful enough to draw the stock through the forming rolls, particularly because of the fact that, as shown in Fig. 15, the power is applied to the feed slide by the rocking lever 207 and link 209, almost, or practically in line with the feed line. While the forming rolls need not be positively driven, it is desirable, for the heavier classes of work, that such combined straightening and forming rolls be positively driven. In the example given, the rolls of the two sets are geared together by the companion pinions 284, 285 and the rolls of one set are driven by a gear 286 on the upper end of a shaft 287, carrying a bevel pinion 288 in mesh with an intermittently operated bevel gear 289. The step by step operation is effected in the illustration by a ball clutch 290 on rock lever 291, Fig. 29, connected by link 292 to an adjustable throw crank 293 on shaft 294, shown as coupled by universally jointed shafting 295 to the end of the back cam shaft 32.

The stock may be cut or knurled either before or after it leaves the forming rolls as shown particularly in Figs. 27 and 30, where a knurling roll is shown at 296 cooperating with a backing roll 297, to press the knurls or cuts 298 in the ridged portions of the stock. These knurling devices are indicated as adjustably mounted at 299, at the exit end of the forming roll box and as impositively driven through engagement with the stock, but it will be understood that if desired, these rolls, like the forming rolls, may be positively driven.

The forming rolls when positively driven serve in part as feed rolls and may, in certain cases be utilized wholly to accomplish that purpose. In the case illustrated, the feed slide is used and the forming rolls are timed to exert sufficient drag on the stock to accomplish the cross-sectional shaping of the stock without affecting the accuracy of the feed mechanism.

For some operations, cams are required of larger diameter than will fit in the spaces between the cam shafts and the adjoining edges of the bed. To meet this situation, a construction such as shown in Fig. 32 may be employed wherein such a large diameter cam is indicated at 300, mounted on a countershaft 301, driven from the cam shaft, in this instance, the cam shaft 32, by the gear train 302, 303, 304. This extra or supplemental cam shaft is shown as carried by a special bracket 305, bolted to the bed and serving as a mounting for the cam slide 306, coupled to actuate the tool 184. By the attachment described, cams of any large diameters may be readily used on the machine.

From the foregoing it will be realized that the machine is capable of many different uses, and adapted to the manufacture of a great variety of articles, particularly so because of the practically universal adaptability and number of slides, operating vertically as well as horizontally, the interchangeability of the rams, in any desired number, the ready replaceability of different tools and the various possibilities of synchronization attainable by the selective use of any of the continuously coupled angularly related cam shafts. The cams are preferably fixed in adjustable and readily removable relation on the cam shafts, which with the adjustability of the parts on the bed makes it possible to readily space and position the different mechanisms to effect different operations of cutting, punching and bending, etc. If desired, the rotary motion shown as taken from one cam shaft for operating feed rolls, may be utilized for other purposes such as drilling, reaming, tapping or driving screws or the like. The reciprocating motions may be utilized for such other purposes as "staking", driving parts together, welding, or other functions where pressure is required. All the action is low on the bed and this with the loop form of drive, the supporting of the heavy duty cam shaft with extra bearings at the rams and the general solidity of construction gives the machine a balance, smoothness of operation and freedom from vibration. The end-to-end geared cam shafts are readily unmeshed upon removal of the top bearing caps and rotation of the lower bearing halves, the power drive is removable as a complete unit and all parts of the machine are accessible so that operation is easily checked. The checking of the relation and operation of the parts is particularly facilitated by the shaping of the rim of the balance wheel to be grasped and turned by hand and the placing of this hand wheel on the intermediate shaft geared in higher speed ratio to the end cam shaft to render hand power thus applied sufficient to turn over the machine.

The availability of one or any number of rams located in various relations on the bed, renders the machine particularly "flexible" for different kinds of work and the ability to form the stock as it feeds into the machine enables many special operations to be accomplished. The control of the feed slide by friction brakes which hold it while the lost motion is taken up at each reversal of movement, the positive limit stop for the slide and the check for holding the advanced stock, operated as it is from the shaft geared to the shaft which operates the feed, all contribute to provide powerful, accurate feeding, enabling finer operations to be accomplished than has heretofore been considered possible on machines of this general type.

Many other advantages will be apparent and it will be apparent furthermore that the structure may be modified within a wide range, as intended by the claims. In view of the broad scope of the invention, therefore, the terms employed herein are to be considered in a descriptive rather than in a limiting sense, except possibly for limitations such as may be required by the state of the prior art.

What is claimed is:

1. A combination machine of the character disclosed, comprising a base having bearing supporting portions, shafts arranged in quadrangular relation, bearings supporting said shafts on said base, said bearings being split substantially horizontally and substantially on the centers of the shafts with the upper halves of the bearings in the form of vertically removable bearing caps and the lower halves of the bearings rotatably shiftable in said bearing supporting portions of the base whereby they may be rocked to enable shifting of the shafts away from each other, miter gears on the ends of all said shafts and engaged to couple said shafts in a continuous end-to-end driving loop, means for applying power to one of the shafts and machine devices operated by the several shafts through the continuous power of the loop described.

2. A machine of the character disclosed, comprising in combination a base, a horizontal drive shaft journalled at one end of said base, miter gears on opposite ends of said drive shaft, horizontal shafts journalled at opposite sides of the base and provided with miter gears engaging the miter gears on the ends of the drive shaft, miter gears on the opposite ends of the side shafts, a horizontal shaft journalled at the opposite end of the base parallel to the drive shaft and having miter gears on opposite ends of the same in mesh with the last-mentioned miter gears on the ends of the side shafts and metal working devices on the base operated by said shafts, the base having horizontally split bearings for the shafts with the upper halves of the same removable and the lower halves shiftable in supported relation on the base to provide clearance for shifting the shafts out of meshed engagement.

3. A machine of the character disclosed, comprising in combination a base, a horizontal drive shaft journalled at one end of said base, miter gears on opposite ends of said drive shaft, horizontal shafts journalled at opposite sides of the base and provided with miter gears engaging the miter gears on the ends of the drive shaft, miter gears on the opposite ends of the side shafts, a horizontal shaft journalled at the opposite end of the base parallel to the drive shaft and having miter gears on opposite ends of the same in mesh with the last-mentioned miter gears on the ends of the side shafts and metal working devices on the base operated by said shafts, the base having horizontally split bearings for the shafts with removable bearing caps and rotatable bearing sections which can be turned to free the shafts from meshed engagement.

4. A machine of the character disclosed, comprising in combination a base, a horizontal drive shaft journalled at one end of said base, miter gears on opposite ends of said drive shaft, horizontal shafts journalled at opposite sides of the base and provided with miter gears engaging the miter gears on the ends of the drive shaft, miter gears on the opposite ends of the side shafts, a horizontal shaft journalled at the opposite end of the base parallel to the drive shaft and having miter gears on opposite ends of the same in mesh with the last-mentioned miter gears on the ends of the side shafts and metal working devices on the base operated by said shafts, the base having horizontally split bearings for the shafts with removable bearing caps and rotatable bearing sections which can be turned to free the shafts from meshed engagement, said shiftable bearing elements having projecting portions and means for interlocking engagement with said projecting portions for applying power to rotate said shiftable bearing elements.

5. A machine of the character disclosed, comprising a substantially rectangular bed having rectangularly divergent bearing arms at the four corners of the same, horizontally split bearings carried by said arms including removable top bearing caps keyed to the arms and substantially semi-cylindrical bearing segments rotatable in the bearing arms, shafts journalled in said bearings and having intermeshed miter gears and machine devices on the bed operated by said shafts.

6. A machine of the character disclosed, comprising a base, a panel removably mounted at one end of said base, a motor on said removable panel, a balance shaft journalled on said panel, drive gearing between said motor and shaft including a clutch and control means for the clutch also mounted on the panel, a shaft journalled on the base, drive gearing from said balance shaft to said shaft on the base, shafting driven from said base-supported shaft and machine devices on the base operated by said shafting.

7. A machine of the character disclosed, comprising a four-sided pedestal carrying a substantially horizontal machine bed, shafts journalled in rectangular relation on the base about the four sides of the bed, gearing connecting said shafts in end-to-end relation, machine devices mounted on the bed and driven from such shafts and a power unit mounted on one end of the pedestal beneath the shaft at said end and having a driving connection with said shaft including a clutch and a fly wheel.

8. In a machine of the character disclosed, the combination of a machine bed having shaft bearings, a cam shaft journalled in said bearings and a detachable unit operated from said cam shaft and including a base removably secured on the bed and carrying a bearing for said cam shaft located and supporting said cam shaft between said shaft bearings on the machine bed.

9. A machine of the character disclosed, comprising in combination, a base, shaft end bearings on said base, a cam shaft mounted in said end bearings on said base, cams on the intermediate portion of said shaft and units mounted on said base and operated from the cams on the intermediate portion of said shaft, said units comprising bases secured to the supporting base and carrying bearings for the intermediate portion of the cam shaft adjacent the cams thereon.

10. A machine of the character disclosed, comprising in combination, a machine bed, a unit including a removable base, mounted on the top and engaged down over the side of the bed, a cam shaft for operation of said unit, end bearings for said cam shaft carried by the bed and an intermediate bearing for said cam shaft carried by said side portion of the base and braced by engagement with the side of the bed.

11. In a machine of the character disclosed, the combination of a substantially horizontal machine bed, a shaft at one side of said bed, a backing shoulder on the bed at the opposite side of the same, a plurality of machine tools removably and adjustably mounted in side by side relation on said bed and having structural parts of the same in supported relation against said backing shoulder and cams on said shaft for independently operating said machine tools.

12. In combination, a machine bed, co-operating structures of machine tools independently secured in adjustable relation on said bed and a bridge member removably secured to said cooperating structures over the bed and tying the same together in adjusted relation independently of the mounting of the same on the bed.

13. In combination, a machine bed, co-operating structures of machine tools independently secured in adjustable relation on said bed, a bridge member removably secured to said cooperating structures over the bed and tying the same together in adjusted relation independently of the mounting of the same on the bed, said cooperating structures being relatively adjustable and means for enabling the securing of the bridge member to accommodate such relative adjustment of said cooperating structures.

14. In combination, a machine bed co-operating structures of a machine tool, means for separately securing the same on said machine bed, a bridging member for rigidly connecting the two structures together over the bed and means for adjustably securing said bridging member in such connecting relation.

15. In combination, a machine bed cooperating structures of a machine tool, means for separately securing the same on said machine bed, a bridging member for rigidly connecting the two structures together over the bed and means for adjustably securing said bridging member in such connecting relation, including adjustable wedge means between the bridge member and one of said structures.

16. In combination, a machine bed having a backing shoulder at one side, a cam shaft at the opposite side of said bed, a machine tool mounted on the bed, connections for operating the same from said cam shaft and said machine tool having a structural part of the same mounted on the bed at the side opposite the cam shaft in supported relation against said backing shoulder.

17. In combination, a machine bed having a backing shoulder at one side, a cam shaft at the opposite side of said bed, a machine tool mounted on the bed, connections for operating the same from said cam shaft, said machine tool having a structural part of the same mounted on the bed at the side opposite the cam shaft in supported relation against said backing shoulder and a tie member extending over the machine tool and securing the parts of the same together independently of the bed structure.

18. In combination, a machine bed, a machine tool mounted on said bed, and comprising cooperating structures, one having a side face opposed to the other, an element engaged over said side face of the structure and companion clamping members for removably securing said element, one of said clamping members being removably secured to the top of the structure and the cooperating clamping member being removably secured to the base of the structure with part of the same positioned and secured between the bed and the base of the structure.

19. A combination machine of the character disclosed, comprising a base having bearing supporting portions, split bearings carried by said bearing supporting portions and including removable bearing caps and bearing halves rotatably mounted in the bearing supporting portions, a shaft journalled in said split bearings and adapted to be displaced in respect to the base upon removal of the bearing caps and the rotatable shifting of the bearing halves in the bearing supporting portions aforesaid.

20. A combination machine of the character disclosed, comprising a base, shafts mounted in angular relation at the sides of said base, bevel gears connecting the ends of said shafts, an extension shaft connected to the end of one of said shafts and extending beyond said bevel gears, a base extension at one end of the base and means on said base extension driven by said extension shaft.

21. A combination machine of the character disclosed, comprising a machine bed carrying main shaft bearings, a drive shaft journalled at its ends in said main bearings, machine tool structures adjustably and removably mounted on the machine bed in positions intermediate the main bearings of the drive shaft and auxiliary bearings for the drive shaft carried by said removable structures for supporting the intermediate portion of the shaft between the main bearings for the same.

In testimony whereof I affix my signature.

ALWYN E. BORTON.